(12) United States Patent
Wu et al.

(10) Patent No.: US 11,985,526 B2
(45) Date of Patent: May 14, 2024

(54) TRANSMISSION METHOD, NETWORK DEVICE, AND TERMINAL

(71) Applicant: VIVO MOBILE COMMUNICATION CO.,LTD., Guangdong (CN)

(72) Inventors: Kai Wu, Guangdong (CN); Xueming Pan, Guangdong (CN)

(73) Assignee: Vivo Mobile Communication Co., Ltd., Guangdong (CN)

( * ) Notice: Subject to any disclaimer, the term of this patent is extended or adjusted under 35 U.S.C. 154(b) by 342 days.

(21) Appl. No.: 17/474,511

(22) Filed: Sep. 14, 2021

(65) Prior Publication Data

US 2022/0022070 A1 Jan. 20, 2022

Related U.S. Application Data

(63) Continuation of application No. PCT/CN2020/078614, filed on Mar. 10, 2020.

(30) Foreign Application Priority Data

Mar. 14, 2019 (CN) .......................... 201910193382.7

(51) Int. Cl.
*H04W 24/08* (2009.01)
*H04W 24/10* (2009.01)
*H04W 72/044* (2023.01)
*H04W 72/23* (2023.01)
*H04W 76/28* (2018.01)

(52) U.S. Cl.
CPC ........... *H04W 24/08* (2013.01); *H04W 24/10* (2013.01); *H04W 72/044* (2013.01); *H04W 72/23* (2023.01); *H04W 76/28* (2018.02)

(58) Field of Classification Search
None
See application file for complete search history.

(56) References Cited

U.S. PATENT DOCUMENTS

| 10,869,295 | B2 * | 12/2020 | Fu ..................... H04W 52/0229 |
| 2016/0128028 | A1 | 5/2016 | Mallik et al. |
| 2018/0092070 | A1 * | 3/2018 | Liao ..................... H04L 1/0028 |
| 2019/0045532 | A1 * | 2/2019 | Zhu ........................ H04W 72/23 |

(Continued)

FOREIGN PATENT DOCUMENTS

| CN | 106792792 A | 5/2017 |
| CN | 107872883 A | 4/2018 |

(Continued)

OTHER PUBLICATIONS

ZTE, "Power consumption reduction for physical channels for Nb-Iot", 3GPP TSG RAN WG1 Meeting #90, R1-1713015, Prague, Czech Republic, Aug. 21-25, 2017.

(Continued)

*Primary Examiner* — Brian S Roberts
(74) *Attorney, Agent, or Firm* — Price Heneveld LLP (57) ABSTRACT

A transmission method, a network device, and a terminal are provided. The method includes: sending indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

20 Claims, 4 Drawing Sheets

(56) References Cited

U.S. PATENT DOCUMENTS

2019/0150183 A1* 5/2019 Aiba ................ H04W 24/10
370/336
2021/0168759 A1 6/2021 Pan et al.

FOREIGN PATENT DOCUMENTS

| CN | 109392133 A | 2/2019 |
|---|---|---|
| CN | 109392136 A | 2/2019 |
| JP | 2017539128 A | 12/2017 |
| KR | 20090083269 A | 8/2009 |
| KR | 20170083476 A | 7/2017 |
| WO | 2013141530 A1 | 9/2013 |
| WO | 2019015459 A1 | 1/2019 |

OTHER PUBLICATIONS

VIVO, "Remaining details on wake-up signal functions for feNB-IoT", 3GPP TSG RAN WG1 Meeting #90bis, R1-1717457, Prague, Czech Republic, Oct. 9-13, 2017.

VIVO, "Discussion on search space design supporting dynamic DCI size," 3GPP TSG RAN WG1 AH_NR Meeting 2, R1-1710393, Qingdao, P.R. China Jun. 27-30, 2017 (2 pages).

VIVO, "Discussion on triggering adaption of UE power consumption characteristics", 3GPP TSG RAN WG1 #95, R1-1812331, Spokane, USA, Nov. 12-16, 2018.

Mediatek Inc., "On 2-stage Downlink Control Information for NR", 3GPP TSG RAN WG1 Meeting #87, R1-1612121, Reno, USA, Nov. 14-18, 2016.

3RD Generation Partnership Project, Technical Specification Group Radio Access Network, "Multiplexing and channel coding", Release 15, 3GPP TS 38.212, v15.4.0, Dec. 2018.

Motorola Mobility, Lenovo, "Feature lead summary for NR-U DL Signals and Channels", 3GPP TSG RAN WG1#96, R1-1903687, Feb. 25-Mar. 1, 2019, Athens, Greece.

* cited by examiner

TRANSMISSION METHOD, NETWORK DEVICE, AND TERMINAL

CROSS-REFERENCE TO RELATED APPLICATIONS

This application is continuation application of PCT International Application No. PCT/CN2020/078614 filed on Mar. 10, 2020, which claims priority to Chinese Patent Application No. 201910193382.7, filed in China on Mar. 14, 2019, which are incorporated in their entireties by reference herein.

TECHNICAL FIELD

The present disclosure relates to the field of communications technologies, and in particular, to a transmission method, a network device, and a terminal.

BACKGROUND

In a new radio (NR) system, a physical downlink control channel (PDCCH) is used to transmit downlink control information (DCI). Normally, the number of DCI bits is greater than or equal to 12. If the number of bits transmitted on the PDCCH is less than 12, 0s need to be added to make the DCI 12 bits long before cyclic redundancy check (CRC) bits are added (specifically, including CRC bits scrambled by using a radio network temporary identifier (RNTI)), and then polar coding is performed. The encoded bits are scrambled and modulated using quadrature phase shift keying (QPSK) modulation to output a modulated symbol sequence, and the modulated symbol sequence is mapped to corresponding control channel element (CCE) resources for sending.

For reception of a PDCCH, a terminal needs to receive the PDCCH on CCE resources, including demodulating, decoding, descrambling, and performing a CRC check on the symbol sequence of the PDCCH. If the CRC check succeeds, the terminal considers that a PDCCH is detected. Therefore, in the related art, complexity of PDCCH reception is high, resulting in high power consumption of the terminal in monitoring.

SUMMARY

Embodiments of the present disclosure provide a transmission method, a network device, and a terminal to resolve a problem that high complexity of PDCCH reception causes high power consumption of the terminal in detection.

According to a first aspect, an embodiment of the present disclosure provides a transmission method, applied to a network device and including:

sending indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

According to a second aspect, an embodiment of the present disclosure further provides a transmission method, applied to a terminal and including:

receiving indication information from a network device, where the indication information includes a first indication, the first indication is used to indicate bit information of one or more bits to be monitored by a terminal, and the one or more bits to be monitored is at least one bit of downlink control information (DCI) on a physical downlink control channel (PDCCH); and monitoring the one or more bits to be monitored.

According to a third aspect, an embodiment of the present disclosure further provides a network device, including:

a sending module, configured to send indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

According to a fourth aspect, an embodiment of the present disclosure further provides a terminal, including:

a receiving module, configured to receive indication information from a network device, where the indication information includes a first indication, the first indication is used to indicate bit information of one or more bits to be monitored by a terminal, and the one or more bits to be monitored is at least one bit of downlink control information (DCI) on a physical downlink control channel (PDCCH); and a monitoring module, configured to monitor the one or more bits to be monitored.

According to a fifth aspect, an embodiment of the present disclosure further provides a network device, including a memory, a processor, and a program stored in the memory and capable of running on the processor, where when the program is executed by the processor, the steps of the foregoing transmission method on the network device side are implemented.

According to a sixth aspect, an embodiment of the present disclosure further provides a terminal, including a memory, a processor, and a program stored in the memory and capable of running on the processor, where when the program is executed by the processor, the steps of the foregoing transmission method on the terminal side are implemented.

According to a seventh aspect, an embodiment of the present disclosure further provides a computer-readable storage medium, where the computer-readable storage medium stores a program, and when the program is executed by a processor, the steps of the foregoing transmission method on the network device side are implemented, or when the program is executed by a processor, the steps of the foregoing transmission method on the terminal side are implemented.

In the embodiments of the present disclosure, the network device sends the indication information, where the indication information indicates the bit information of the one or more bits to be monitored by the terminal, so that the terminal can learn the number of bits that need to be detected and the corresponding bit positions. Therefore, the terminal can use a detection algorithm with relatively low complexity to perform detection, thus avoiding complex detection processes of a conventional detection algorithm such as channel estimation, detection, and decoding. Therefore, the embodiments of the present disclosure can reduce complexity of PDCCH reception, thereby reducing power consumption in detection.

DESCRIPTION OF EMBODIMENTS

The following clearly describes the technical solutions in the embodiments of the present disclosure with reference to the accompanying drawings in the embodiments of the present disclosure. Apparently, the described embodiments are merely a part rather than all of the embodiments of the present disclosure. All other embodiments that a person of ordinary skill in the art obtains without creative efforts based on the embodiments of the present disclosure shall fall within the protection scope of the present disclosure.

In the specification and claims of this application, the term "including", and any other variant thereof mean to cover a non-exclusive inclusion. For example, a process, method, system, product, or device that includes a list of steps or units is not necessarily limited to those steps or units, but may include other steps or units not expressly listed or inherent to such a process, method, system, product, or device. In addition, the term "and/or" used in the specification and claims indicates at least one of connected objects. For example, "A and/or B" represents the following three cases: Only A exists, only B exists, and both A and B exist. Similarly, the term "at least one of A and B" used in the specification and claims should be understood as "only A exists, only B exists, or both A and B exist".

In the embodiments of the present disclosure, terms such as "an example" or "for example" are used to represent an example, an instance, or an illustration. Any embodiment or design solution described as "an example" or "for example" in the embodiments of the present disclosure shall not be interpreted to be more preferential or advantageous than other embodiments or design solutions. Specifically, the terms such as "an example" or "for example" are intended to present related concepts in a specific manner.

The following describes the embodiments of the present disclosure with reference to the accompanying drawings. A transmission method, a network device, and a terminal provided in the embodiments of the present disclosure may be applied to a wireless communications system. The wireless communications system may be a 5G system, or an evolved long term evolution (eLTE) system, or a later evolved communications system.

Figure 1:
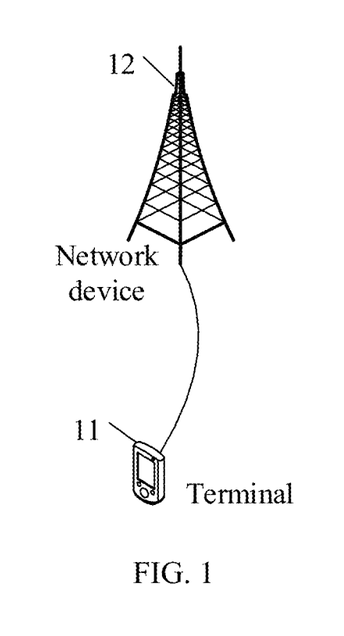
FIG. 1 is a structural diagram of a network system to which an embodiment of the present disclosure may be applied.

FIG. 1 is a structural diagram of a network system to which an embodiment of the present disclosure may be applied. As shown in FIG. 1, the network system includes a terminal 11 and a network device 12. The terminal 11 may be a user terminal or another terminal-side device, for example, a mobile phone, a tablet personal computer, a laptop computer, a personal digital assistant (PDA), a mobile Internet device (MID), or a wearable device. It should be noted that a specific type of the terminal 11 is not limited in this embodiment of the present disclosure. The network device 12 may be a 5G base station, or a base station of a later version, or a base station in another communications system, or is referred to as a NodeB, or an evolved NodeB, or a transmission and reception point (Transmission Reception Point, TRP), or an access point (AP), or other terms in the art. As long as a same technical effect is achieved, the network device is not limited to a specific technical term. In addition, the network device 12 may be a master node (MN) or a secondary node (SN). It should be noted that the 5G base station is used merely as an example in this embodiment of the present disclosure, rather than limiting a specific type of the network device.

Figure 2:
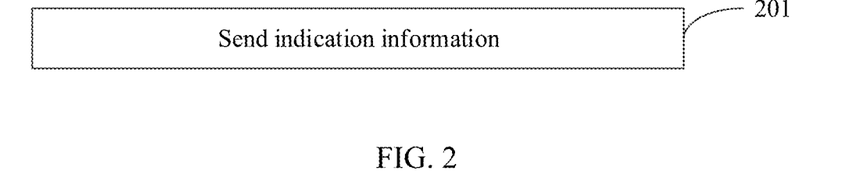
FIG. 2 is a flowchart of a transmission method according to an embodiment of the present disclosure.

FIG. 2 is a flowchart of a transmission method according to an embodiment of the present disclosure. The method is applied to a network device. As shown in FIG. 2, the method includes the following steps.

Step 201: Send indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

In this embodiment of the present disclosure, the network device may send the indication information in a plurality of manners. For example, in some optional embodiments, the indication information may be transmitted by using at least one of system information, radio resource control (RRC) signaling, a medium access control-control element (MAC-CE), and the PDCCH. Specifically, which manner is used to transmit the indication information may be prescribed. For example, one or more of the system information, the RRC signaling, the MAC-CE, and the PDCCH may be used to send the indication information.

In an NR system, the number of bits used to transmit the DCI on the PDCCH may be understood as the total number of bits of the DCI on the PDCCH, and the number of bits is generally greater than or equal to 12. The number of bits to be monitored is related to information transmitted on the PDCCH. When there are few bits of information transmitted on the PDCCH, the number of bits to be monitored may be less than the total number of bits of the DCI on the PDCCH. For example, in some optional embodiments, the total number of bits of the DCI on the PDCCH is 12, the number of bits to be monitored is 2, and the other bits are all known bits.

In this embodiment of the present disclosure, the foregoing bit is information may include the number of bits and/or positions of bits. Specifically, in some optional embodiments, the number of bits is prescribed by a protocol. In this case, the first indication may be used to indicate the positions of bits. In other embodiments, the positions of bits may be prescribed by a protocol. For example, bits starting from an $N^{th}$ bit are the one or more bits to be monitored. In this case, the first indication may be used to indicate the number of bits. In addition, in this embodiment, the first indication may be further used to indicate the positions of bits and the number of bits.

It should be noted that in this embodiment of the present disclosure, information of one or more bits to be monitored may be indicated per terminal or per group of terminals. Specifically, that the first indication is used to indicate bit information of one or more bits to be monitored by a terminal includes:

the first indication is used to indicate bit information of one or more bits to be monitored by one terminal; or the first indication is used to indicate bit information of one or more bits to be monitored by all terminals in one terminal group.

A specific grouping rule for the terminal group may be set based on an actual situation, and a definition of the terminal group is not further limited herein.

In this embodiment of the present disclosure, the network device sends the indication information, where the indication information indicates the bit information of the one or more bits to be monitored by the terminal, so that the terminal can learn the number of bits that need to be detected and the corresponding bit positions. Therefore, the terminal can use a detection algorithm with relatively low complexity to perform detection, thus avoiding complex detection processes of a conventional detection algorithm such as channel estimation, detection, and decoding. Therefore, this embodiment of the present disclosure can reduce complexity of PDCCH reception, thereby reducing power consumption in detection.

It should be noted that the detection algorithm used by the terminal may be set based on an actual requirement. For example, a sequence detection algorithm may be used for detection. The sequence detection algorithm only needs to perform a correlation operation on the terminal. In some optional embodiments, assuming that information bits transmitted on the PDCCH are two bits, and that other bits are all known bits, such as all-0 bits, actually transmitted sequences are four bit sequences, and in a case in which an RNTI and a scrambling sequence are determined, four modulated symbol sequences may be determined.

In this case, the terminal may use a sequence detection method to detect the PDCCH, that is, perform sequence detection on a received symbol sequence, find a symbol sequence having a highest correlation with four modulation symbol sequences, and use the symbol sequence as the detected symbol sequence. In addition, the terminal determines 2-bit information transmitted on the PDCCH.

Further, based on the foregoing embodiment, in this embodiment, the indication information further includes a second indication, and the second indication is used to indicate at least one of the following:

the number of bits of the DCI;
the number of cyclic redundancy check (CRC) bits;
a radio network temporary identifier (RNTI); and
a scrambling identifier (ID) for PDCCH coded bits.

In this embodiment, content in the second indication is used for PDCCH detection. Specifically, the content in the second indication may be set based on an actual requirement. For example, a part of the content may be prescribed, and a part of the content is indicated by the second indication.

Further, the indication information further includes a third indication, and the third indication is used to indicate at least one of the following:

a search space for the PDCCH;
the number of physical downlink control channel candidates (PDCCH candidates) to be monitored or a subset thereof;
an aggregation level; and
a downlink control information format (DCI format).

In this embodiment, the third indication is used for the terminal to perform PDCCH reception. Specifically, content in the third indication may be set based on an actual requirement. For example, a part of the content may be prescribed, and a part of the content is indicated by the third indication.

It should be noted that a first bit sequence on the PDCCH is configured by a network side or predefined, and the first bit sequence includes other bits than the one or more bits to be monitored among bits of the DCI.

For example, if the number of bits of the DCI on the PDCCH is 12, and the one or more bits to be monitored are a first bit and a second bit, the first bit sequence includes a third bit to a twelfth bit. If each of the third bit to the twelfth bit is 0, the first bit sequence is 0000000000.

In some optional embodiments, the terminal may assume that the other bits than the one or more bits to be monitored are a specific bit sequence (that is, the first bit sequence), and the terminal detects, based on the assumption, a symbol sequence transmitted on the PDCCH. In other optional embodiments, the network device may further indicate the bit sequence of the other bits (that is, the first bit sequence) than the one or more bits to be monitored; and the terminal may obtain corresponding bit information based on the bit sequence of the other bits, and therefore can detect, based on the bit information, the symbol sequence transmitted on the PDCCH.

In this embodiment of the present disclosure, because the bit information of the one or more bits to be monitored is indicated, the terminal obtains, by using the sequence detection method based on the bit information indicated by the network device, information transmitted in the one or more bits to be monitored. In other optional embodiments, sequence transmission may also be performed by using CCE resource sets whose aggregation levels are 1, 2, 4, 8, and 16 among PDCCH transmission resources. The transmitted sequence may be a pseudo-random sequence, a Gold sequence, an m sequence, a ZC sequence, a CGS sequence, a CAZAC sequence, or a sequence obtained through mutual modulation between at least two of the foregoing sequences, and the mutual modulation is element-wise multiplication of at least two bit sequences or element-wise multiplication of two symbol sequences. In this case, the terminal may perform sequence detection, and determine the transmitted information by detecting a sequence having a best correlation with a received signal.

It should be noted that, in this embodiment, the information transmitted on the PDCCH may be used to indicate at least one of the following:

whether the terminal needs to perform PDCCH monitoring within a first discontinuous reception (DRX) on-duration, where the first DRX on-duration is a current DRX on-duration, or next M DRX on-durations after a current moment, and M is a positive integer;

the terminal to perform bandwidth part (BWP) switching, where the information transmitted on the PDCCH may be an ID of a BWP;

the terminal to activate or deactivate an object, where the object is a cell group or a carrier group;

the terminal to stop PDCCH monitoring in a preset time period, where the preset time period may be expressed as: before a next DRX on-duration starts, or before a next periodic PDCCH search time window, or within a current DRX on-duration;

the terminal to switch between receive antennas;
a slot structure for the terminal;
the terminal to trigger reporting of channel state information (CSI);
the terminal to trigger sending of a sounding reference signal (SRS);
the terminal to receive a tracking reference signal (TRS);
the terminal to receive a channel state information reference signal (CSI-RS);
the terminal to perform at least one of beam management (BM) measurement, radio link monitoring (Radio Link Management, RLM) measurement, and radio resource management (RRM) measurement;

at least one of a total duration of a channel occupancy time (COT) of the terminal in a new radio interface unlicensed frequency band (NR-U), a remaining duration, and a channel access priority;

a power control parameter for sending an uplink physical channel and/or physical signal by the terminal; and the terminal to activate different DRX configurations or search space configurations.

In this embodiment, the information transmitted on the PDCCH is the DCI correspondingly transmitted in the one or more bits to be monitored. Specifically, when the one or more bits to be monitored are at least two bits, each bit may be used to indicate one of the foregoing items, or different bit combinations may be used to indicate that the corresponding terminal is to perform an operation corresponding to the content indicated above. For example, when the one or more bits to be monitored include at least two bits, a bit combination of the one or more bits to be monitored indicates that the corresponding terminal is to perform a first operation, where the first operation is an operation corresponding to the information transmitted on the PDCCH, and bit combinations correspond to terminals on a one-to-one basis, or bit combinations correspond to terminal groups on a one-to-one basis.

For example, in the following description, it is assumed that the one or more bits to be monitored are two bits.

Specifically, in some optional embodiments, one bit may be used to indicate whether the terminal is to perform a first target operation, and the other bit may be used to indicate whether the terminal is to perform a second target operation, where the first target operation and the second target operation are different operations in the first operation.

In other optional embodiments, two bits may be used to indicate whether the terminal is to perform the first operation.

In still other optional embodiments, when the sequence of the one or more bits to be monitored is 00, the one or more bits to be monitored may be used to indicate that a terminal numbered 0 is to perform the first operation; when the sequence of the one or more bits to be monitored is 01, the one or more bits to be monitored may be used to indicate that a terminal numbered 1 is to perform the first operation; when the sequence of the one or more bits to be monitored is 10, the one or more bits to be monitored may be used to indicate that a terminal numbered 2 is to perform the first operation; or when the sequence of the one or more bits to be monitored is 11, the one or more bits to be monitored may be used to indicate that a terminal numbered 3 is to perform the first operation.

For better understanding the present disclosure, the following describes a PDCCH transmission process in detail by using two different implementations.

In one implementation, the network side indicates, by using RRC signaling, that the number of DCI bits to be monitored by the UE is 2, and the indicated two bits to be monitored by the UE are an $x^{th}$ bit and a $y^{th}$ bit in a DCI bit sequence.

The $x^{th}$ bit is used to indicate whether the UE needs to monitor the PDCCH in the next DRX on-duration, and the $y^{th}$ bit is used to indicate whether the UE needs to perform CSI feedback.

Alternatively, in an NR unlicensed frequency band scenario, the two bits are used to indicate, to the UE, a remaining time of the channel obtained by the network side, such as 1 ms, 2 ms, 3 ms, or 4 ms.

In the other implementation, the network side indicates, by using RRC signaling, that the number of DCI bits to be monitored by the UE is 2, and the indicated two bits to be monitored by the UE are an $x^{th}$ bit and a $y^{th}$ bit in a DCI bit sequence.

When the two bits are 00, it indicates that UE #0 needs to monitor the PDCCH within a next DRX on-duration after the current moment, or indicates that a UE group #0 needs to monitor the PDCCH within a next DRX on-duration after the current moment.

When the two bits are 01, it indicates that UE #1 needs to monitor the PDCCH within a next DRX on-duration after the current moment, or indicates that a UE group #1 needs to monitor the PDCCH within a next DRX on-duration after the current moment.

When the two bits are 10, it indicates that UE #2 needs to monitor the PDCCH within a next DRX on-duration after the current moment, or indicates that a UE group #2 needs to monitor the PDCCH within a next DRX on-duration after the current moment.

When the two bits are 11, it indicates that UE #3 needs to monitor the PDCCH within a next DRX on-duration after the current moment, or indicates that a UE group #3 needs to monitor the PDCCH within a next DRX on-duration after the current moment.

Figure 3:
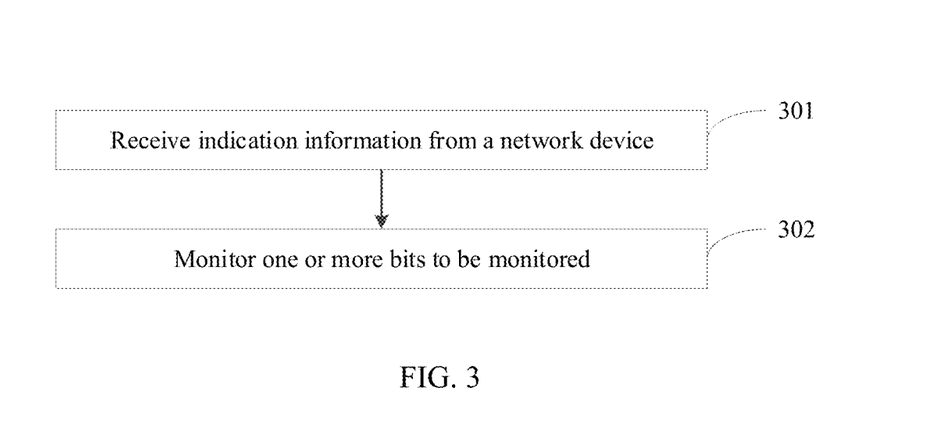
FIG. 3 is a flowchart of another transmission method according to an embodiment of the present disclosure.

FIG. 3 is a flowchart of another transmission method according to an embodiment of the present disclosure. The method is applied to a terminal. As shown in FIG. 3, the method includes the following steps.

Step 301: Receive indication information from a network device, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

Step 302: Monitor the one or more bits to be monitored.

Optionally, the bit information includes the number of bits and/or positions of bits.

Optionally, the indication information further includes a second indication, and the second indication is used to indicate at least one of the following:

the number of bits of the DCI;
the number of cyclic redundancy check (CRC) bits;
a radio network temporary identifier (RNTI); and
a scrambling ID for PDCCH coded bits.

Optionally, the indication information further includes a third indication, and the third indication is used to indicate at least one of the following:

a search space for the PDCCH;
the number of physical downlink control channel candidates (PDCCH candidates) to be monitored or a subset thereof;
an aggregation level; and
a downlink control information format (DCI format).

Optionally, that the first indication is used to indicate bit information of one or more bits to be monitored by a terminal includes:

the first indication is used to indicate bit information of one or more bits to be monitored by one terminal; or
the first indication is used to indicate bit information of one or more bits to be monitored by all terminals in one terminal group.

Optionally, a first bit sequence on the PDCCH is configured by a network side or predefined, and the first bit sequence includes other bits than the one or more bits to be monitored among bits of the DCI.

Optionally, the indication information is transmitted by using at least one of system information, radio resource control (RRC) signaling, a medium access control-control element (MAC-CE), and the PDCCH.

Optionally, information transmitted on the PDCCH is used to indicate at least one of the following:

whether the terminal needs to perform PDCCH monitoring within a first discontinuous reception (DRX) on-duration, where the first DRX on-duration is a current DRX on-duration, or next M DRX on-durations after a current moment, and M is a positive integer;

the terminal to perform bandwidth part (BWP) switching;

the terminal to activate or deactivate an object, where the object is a cell group or a carrier group;

the terminal to stop PDCCH monitoring in a preset time period, where the preset time period may be expressed as: before a next DRX on-duration starts, or before a next periodic PDCCH search time window, or within a current DRX on-duration;

the terminal to switch between receive antennas;

a slot structure for the terminal;

the terminal to trigger reporting of channel state information (CSI);

the terminal to trigger sending of a sounding reference signal (SRS);

the terminal to receive a tracking reference signal (TRS);

the terminal to receive a channel state information reference signal (CSI-RS);

the terminal to perform at least one of BM measurement, radio link monitoring (RLM) measurement, and radio resource management (RRM) measurement;

at least one of a total duration of a channel occupancy time (COT) in a new radio interface unlicensed frequency band (NR-U), a remaining duration, and a channel access priority to the terminal;

a power control parameter for sending an uplink physical channel and/or physical signal by the terminal; and the terminal to activate different DRX configurations or search space configurations.

Optionally, when the one or more bits to be monitored include at least two bits to be monitored, a bit combination of the one or more bits to be monitored indicates that the corresponding terminal is to perform a first operation, the first operation is an operation corresponding to the information transmitted on the PDCCH, and bit combinations correspond to terminals on a one-to-one basis, or bit combinations correspond to terminal groups on a one-to-one basis.

It should be noted that this embodiment is used as an implementation of the terminal corresponding to the embodiment shown in FIG. 2. For a specific implementation and a same beneficial effect achieved, refer to the related description of the embodiment shown in FIG. 2. Details are not described herein again.

Figure 4:
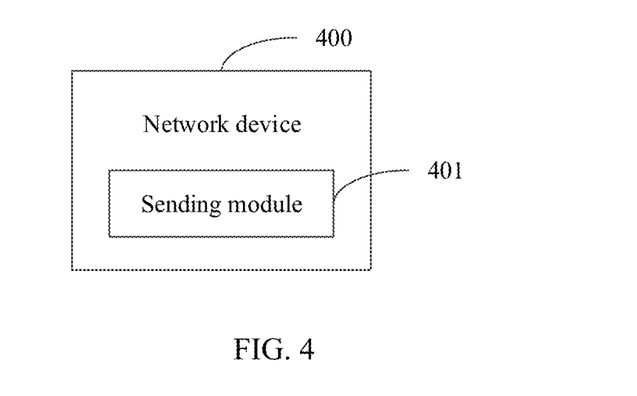
FIG. 4 is a structural diagram of a network device according to an embodiment of the present disclosure.

FIG. 4 is a structural diagram of a network device according to an embodiment of the present disclosure. As shown in FIG. 4, the network device 400 includes:

a sending module 401, configured to send indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

Optionally, the bit information includes the number of bits and/or positions of bits.

Optionally, the indication information further includes a second indication, and the second indication is used to indicate at least one of the following:

the number of bits of the DCI;

the number of cyclic redundancy check (CRC) bits;

a radio network temporary identifier (RNTI); and a scrambling ID for PDCCH coded bits.

Optionally, the indication information further includes a third indication, and the third indication is used to indicate at least one of the following:

a search space for the PDCCH;

the number of physical downlink control channel candidates (PDCCH candidates) or a subset thereof;

an aggregation level; and a downlink control information format (DCI format).

Optionally, that the first indication is used to indicate bit information of one or more bits to be monitored by a terminal includes:

the first indication is used to indicate bit information of one or more bits to be monitored by one terminal; or the first indication is used to indicate bit information of one or more bits to be monitored by all terminals in one terminal group.

Optionally, a first bit sequence on the PDCCH is configured by a network side or predefined, and the first bit sequence includes other bits than the one or more bits to be monitored among bits of the DCI.

Optionally, the indication information is transmitted by using at least one of system information, radio resource control (RRC) signaling, a medium access control-control element (MAC-CE), and the PDCCH.

Optionally, information transmitted on the PDCCH is used to indicate at least one of the following:

whether the terminal needs to perform PDCCH monitoring within a first discontinuous reception (DRX) on-duration, where the first DRX on-duration is a current DRX on-duration, or next M DRX on-durations after a current moment, and M is a positive integer;

the terminal to perform bandwidth part (BWP) switching;

the terminal to activate or deactivate an object, where the object is a cell group or a carrier group;

the terminal to stop PDCCH monitoring in a preset time period, where the preset time period may be expressed as: before a next DRX on-duration starts, or before a next periodic PDCCH search time window, or within a current DRX active duration;

the terminal to switch between receive antennas;

a slot structure for the terminal;

the terminal to trigger reporting of channel state information (CSI);

the terminal to trigger sending of a sounding reference signal (SRS);

the terminal to receive a tracking reference signal (TRS);

the terminal to receive a channel state information reference signal (CSI-RS);

the terminal to perform at least one of BM measurement, radio link monitoring (RLM) measurement, and radio resource management (RRM) measurement;

at least one of a total duration of a channel occupancy time (COT) in a new radio interface unlicensed frequency band (NR-U), a remaining duration, and a channel access priority to the terminal;

a power control parameter for sending an uplink physical channel and/or physical signal by the terminal; and the terminal to activate different DRX configurations or search space configurations.

Optionally, when the one or more bits to be monitored include at least two bits to be monitored, a bit combination of the one or more bits to be monitored indicates that the corresponding terminal is to perform a first operation, the first operation is an operation corresponding to the information transmitted on the PDCCH, and bit combinations correspond to terminals on a one-to-one basis, or bit combinations correspond to terminal groups on a one-to-one basis.

The network device provided in this embodiment of the present disclosure can implement each process implemented by the network device in the method embodiment in FIG. 2. To avoid repetition, details are not described herein again.

Figure 5:
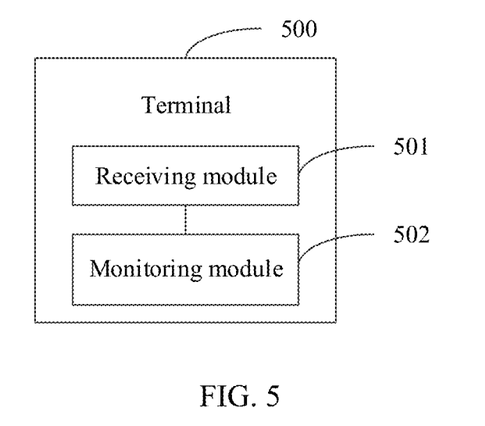
FIG. 5 is a structural diagram of a terminal according to an embodiment of the present disclosure.

FIG. 5 is a structural diagram of a terminal according to an embodiment of the present disclosure. As shown in FIG. 5, the terminal 500 includes:

a receiving module 501, configured to receive indication information from a network device, where the indication information includes a first indication, the first indication is used to indicate bit information of one or more bits to be monitored by a terminal, and the one or more bits to be monitored is at least one bit of downlink control information (DCI) on a physical downlink control channel (PDCCH); and a monitoring module 502, configured to monitor the one or more bits to be monitored.

Optionally, the bit information includes the number of bits and/or positions of bits.

Optionally, the indication information further includes a second indication, and the second indication is used to indicate at least one of the following:

the number of bits of the DCI;
the number of cyclic redundancy check (CRC) bits;
a radio network temporary identifier (RNTI); and
a scrambling ID for PDCCH coded bits.

Optionally, the indication information further includes a third indication, and the third indication is used to indicate at least one of the following:

a search space for the PDCCH;
the number of physical downlink control channel candidates (PDCCH candidates) to be monitored or a subset thereof;
an aggregation level; and
a downlink control information format (DCI format).

Optionally, that the first indication is used to indicate bit information of one or more bits to be monitored by a terminal includes:

the first indication is used to indicate bit information of one or more bits to be monitored by one terminal; or the first indication is used to indicate bit information of one or more bits to be monitored by all terminals in one terminal group.

Optionally, a first bit sequence on the PDCCH is configured by a network side or predefined, and the first bit sequence includes other bits than the one or more bits to be monitored among bits of the DCI.

Optionally, the indication information is transmitted by using at least one of system information, radio resource control (RRC) signaling, a medium access control-control element (MAC-CE), and the PDCCH.

Optionally, information transmitted on the PDCCH is used to indicate at least one of the following:

whether the terminal needs to perform PDCCH monitoring within a first discontinuous reception (DRX) on-duration, where the first DRX on-duration is a current DRX on-duration, or next M DRX on-durations after a current moment, and M is a positive integer;

the terminal to perform bandwidth part (BWP) switching;

the terminal to activate or deactivate an object, where the object is a cell group or a carrier group;

the terminal to stop PDCCH monitoring in a preset time period, where the preset time period may be expressed as: before a next DRX on-duration starts, or before a next periodic PDCCH search time window, or within a current DRX active duration;

the terminal to switch between receive antennas;

a slot structure for the terminal;

the terminal to trigger reporting of channel state information (CSI);

the terminal to trigger sending of a sounding reference signal (SRS);

the terminal to receive a tracking reference signal (TRS);

the terminal to receive a channel state information reference signal (CSI-RS);

the terminal to perform at least one of BM measurement, radio link monitoring (RLM) measurement, and radio resource management (RRM) measurement;

at least one of a total duration of a channel occupancy time (COT) in a new radio interface unlicensed frequency band (NR-U), a remaining duration, and a channel access priority to the terminal;

a power control parameter for sending an uplink physical channel and/or physical signal by the terminal; and the terminal to activate different DRX configurations or search space configurations.

Optionally, when the one or more bits to be monitored include at least two bits to be monitored, a bit combination of the one or more bits to be monitored indicates that the corresponding terminal is to perform a first operation, the first operation is an operation corresponding to the information transmitted on the PDCCH, and bit combinations correspond to terminals on a one-to-one basis, or bit combinations correspond to terminal groups on a one-to-one basis.

The terminal provided in this embodiment of the present disclosure can implement each process implemented by the terminal in the method embodiment in FIG. 3. To avoid repetition, details are not described herein again.

Figure 6:
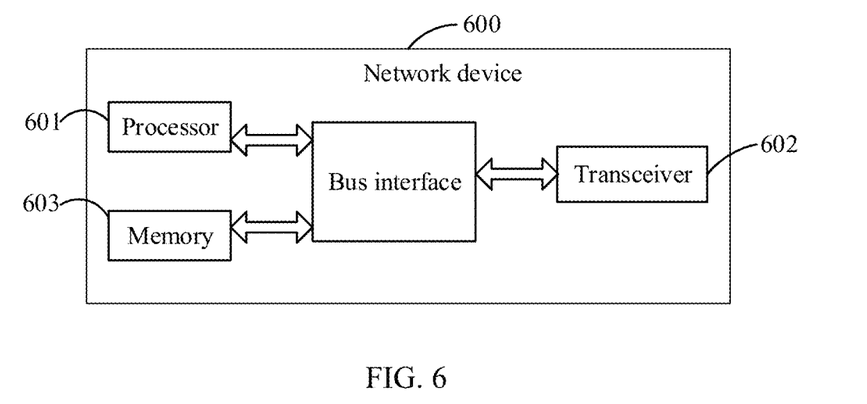
FIG. 6 is a structural diagram of another network device according to an embodiment of the present disclosure.

FIG. 6 is a structural diagram of another network device according to an embodiment of the present disclosure. As shown in FIG. 6, the network device 600 includes a processor 601, a transceiver 602, a memory 603, and a bus interface.

The transceiver 602 is configured to send indication information, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

Optionally, the bit information includes the number of bits and/or positions of bits.

Optionally, the indication information further includes a second indication, and the second indication is used to indicate at least one of the following:

the number of bits of the DCI;
the number of cyclic redundancy check (CRC) bits;
a radio network temporary identifier (RNTI); and
a scrambling ID for PDCCH coded bits.

Optionally, the indication information further includes a third indication, and the third indication is used to indicate at least one of the following:

a search space for the PDCCH;

the number of physical downlink control channel candidates (PDCCH candidates) or a subset thereof;

an aggregation level; and a downlink control information format (DCI format).

Optionally, a first bit sequence on the PDCCH is configured by a network side or predefined, and the first bit sequence includes other bits than the one or more bits to be monitored among bits of the DCI.

Optionally, that the first indication is used to indicate bit information of one or more bits to be monitored by a terminal includes:

the first indication is used to indicate bit information of one or more bits to be monitored by one terminal; or the first indication is used to indicate bit information of one or more bits to be monitored by all terminals in one terminal group.

Optionally, the indication information is transmitted by using at least one of system information, radio resource control (RRC) signaling, a medium access control-control element (MAC-CE), and the PDCCH.

Optionally, information transmitted on the PDCCH is used to indicate at least one of the following:

whether the terminal needs to perform PDCCH monitoring within a first discontinuous reception (DRX) on-duration, where the first DRX on-duration is a current DRX on-duration, or next M DRX on-durations after a current moment, and M is a positive integer;

the terminal to perform bandwidth part (BWP) switching;

that the terminal is to activates or deactivates an object, where the object is a cell group or a carrier group;

the terminal to stop PDCCH monitoring in a preset time period, where the preset time period may be expressed as: before a next DRX on-duration starts, or before a next periodic PDCCH search time window, or within a current DRX active duration;

the terminal to switch between receive antennas;

a slot structure for the terminal;

the terminal to trigger reporting of channel state information (CSI);

the terminal to trigger sending of a sounding reference signal (SRS);

the terminal to receive a tracking reference signal (TRS);

the terminal to receive a channel state information reference signal (CSI-RS);

the terminal to perform at least one of BM measurement, radio link monitoring (RLM) measurement, and radio resource management (RRM) measurement;

at least one of a total duration of a channel occupancy time (COT) in a new radio interface unlicensed frequency band (NR-U), a remaining duration, and a channel access priority to the terminal;

a power control parameter for sending an uplink physical channel and/or physical signal by the terminal; and the terminal to activate different DRX configurations or search space configurations.

Optionally, when the one or more bits to be monitored include at least two bits to be monitored, a bit combination of the one or more bits to be monitored indicates that the corresponding terminal is to perform a first operation, the first operation is an operation corresponding to the information transmitted on the PDCCH, and bit combinations correspond to terminals on a one-to-one basis, or bit combinations correspond to terminal groups on a one-to-one basis.

In this embodiment of the present disclosure, the network device sends the indication information, where the indication information indicates the bit information of the one or more bits to be monitored by the terminal, so that the terminal can learn the number of bits that need to be detected and the corresponding bit positions. Therefore, the terminal can use a detection algorithm with relatively low complexity to perform detection, thus avoiding complex detection processes of a conventional detection algorithm such as channel estimation, detection, and decoding. Therefore, this embodiment of the present disclosure can reduce complexity of PDCCH reception, thereby reducing power consumption in detection.

In FIG. 6, a bus architecture may include any quantity of interconnect buses and bridges, specifically for interconnecting various circuits of one or more processors represented by the processor 601 and a memory represented by the memory 603. The bus architecture may further interconnect various other circuits such as a peripheral device, a voltage regulator, and a power management circuit. These are all well known in the art, and therefore are not further described in this specification. The bus interface provides an interface. The transceiver 602 may be a plurality of components, that is, the transceiver 602 includes a transmitter and a receiver, and provides a unit for communicating with various other apparatuses on a transmission medium. For different user equipment, the bus interface may also be an interface for externally or internally connecting a required device, and the connected device includes but is not limited to a mini keyboard, a display, a speaker, a microphone, a joystick, or the like.

The processor 601 is responsible for bus architecture management and general processing. The memory 603 may store data used when the processor 601 performs an operation.

Optionally, an embodiment of the present disclosure further provides a network device, including a processor 601, a memory 603, and a program stored in the memory 603 and capable of running on the processor 601. When the program is executed by the processor 601, the processes of the foregoing transmission method embodiment can be implemented, with a same technical effect achieved. To avoid repetition, details are not described herein again.

Figure 7:
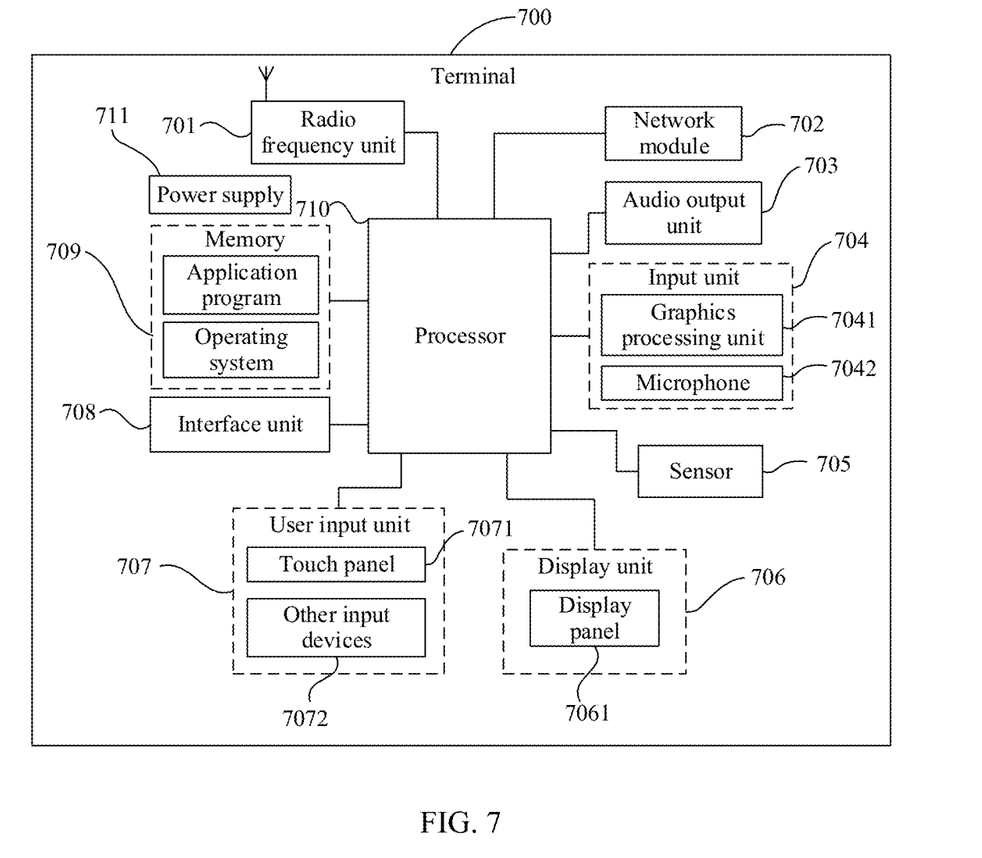
FIG. 7 is a structural diagram of another terminal according to an embodiment of the present disclosure.

FIG. 7 is a schematic diagram of a hardware structure of a terminal for implementing the embodiments of the present disclosure.

The terminal 700 includes but is not limited to components such as a radio frequency unit 701, a network module 702, an audio output unit 703, an input unit 704, a sensor 705, a display unit 706, a user input unit 707, an interface unit 708, a memory 709, a processor 710, and a power supply 711. A person skilled in the art may understand that the structure of the terminal shown in FIG. 7 does not constitute a limitation on the terminal. A quantity of components included in the terminal may be greater or less than that shown in the figure, or some components are combined, or component arrangements are different. In this embodiment of the present disclosure, the terminal includes but is not limited to a mobile phone, a tablet computer, a notebook computer, a palmtop computer, an in-vehicle terminal, a wearable device, a pedometer, or the like.

The radio frequency unit 701 is configured to receive indication information from a network device, where the indication information includes a first indication, the first indication is used to indicate bit information of one or more bits to be monitored by a terminal, and the one or more bits to be monitored is at least one bit of downlink control information (DCI) on a physical downlink control channel (PDCCH).

The processor 710 is configured to monitor the one or more bits to be monitored.

Optionally, the bit information includes the number of bits and/or positions of bits.

Optionally, the indication information further includes a second indication, and the second indication is used to indicate at least one of the following:
the number of bits of the DCI;
the number of cyclic redundancy check (CRC) bits;
a radio network temporary identifier (RNTI); and
a scrambling ID for PDCCH coded bits.

Optionally, the indication information further includes a third indication, and the third indication is used to indicate at least one of the following:
a search space for the PDCCH;
the number of physical downlink control channel candidates (PDCCH candidates) to be monitored or a subset thereof;
an aggregation level; and
a downlink control information format (DCI format).

Optionally, that the first indication is used to indicate bit information of one or more bits to be monitored by a terminal includes:
the first indication is used to indicate bit information of one or more bits to be monitored by one terminal; or
the first indication is used to indicate bit information of one or more bits to be monitored by all terminals in one terminal group.

Optionally, a first bit sequence on the PDCCH is configured by a network side or predefined, and the first bit sequence includes other bits than the one or more bits to be monitored among bits of the DCI.

Optionally, the indication information is transmitted by using at least one of system information, radio resource control (RRC) signaling, a medium access control-control element (MAC-CE), and the PDCCH.

Optionally, information transmitted on the PDCCH is used to indicate at least one of the following:
whether the terminal needs to perform PDCCH monitoring within a first discontinuous reception (DRX) on-duration, where the first DRX on-duration is a current DRX on-duration, or next M DRX on-durations after a current moment, and M is a positive integer;
the terminal to perform bandwidth part (BWP) switching;
that the terminal is to activates or deactivates an object, where the object is a cell group or a carrier group;
the terminal to stop PDCCH monitoring in a preset time period, where the preset time period may be expressed as: before a next DRX on-duration starts, or before a next periodic PDCCH search time window, or within a current DRX active duration;
the terminal to switch between receive antennas;
a slot structure for the terminal;
the terminal to trigger reporting of channel state information (CSI);
the terminal to trigger sending of a sounding reference signal (SRS);
the terminal to receive a tracking reference signal (TRS);
the terminal to receive a channel state information reference signal (CSI-RS);
the terminal to perform at least one of BM measurement, radio link monitoring (RLM) measurement, and radio resource management (RRM) measurement;
at least one of a total duration of a channel occupancy time (COT) in a new radio interface unlicensed frequency band (NR-U), a remaining duration, and a channel access priority to the terminal;
a power control parameter for sending an uplink physical channel and/or physical signal by the terminal; and
the terminal to activate different DRX configurations or search space configurations.

Optionally, when the one or more bits to be monitored include at least two bits to be monitored, a bit combination of the one or more bits to be monitored indicates that the corresponding terminal is to perform a first operation, the first operation is an operation corresponding to the information transmitted on the PDCCH, and bit combinations correspond to terminals on a one-to-one basis, or bit combinations correspond to terminal groups on a one-to-one basis.

In this embodiment of the present disclosure, the network device sends the indication information, where the indication information indicates the bit information of the one or more bits to be monitored by the terminal, so that the terminal can learn the number of bits that need to be detected and the corresponding bit positions. Therefore, the terminal can use a detection algorithm with relatively low complexity to perform detection, thus avoiding complex detection processes of a conventional detection algorithm such as channel estimation, detection, and decoding. Therefore, this embodiment of the present disclosure can reduce complexity of PDCCH reception, thereby reducing power consumption in detection.

It should be understood that in this embodiment of the present disclosure, the radio frequency unit 701 may be configured to: receive and transmit signals in an information receiving/transmitting process or a call process; and specifically, after receiving downlink data from a base station, transmit the downlink data to the processor 710 for processing, and in addition, transmit uplink data to the base station. Generally, the radio frequency unit 701 includes but is not limited to an antenna, at least one amplifier, a transceiver, a coupler, a low noise amplifier, a duplexer, and the like. In addition, the radio frequency unit 701 may further communicate with a network and another device through a wireless communications system.

The terminal provides wireless broadband Internet access for a user by using the network module 702, for example, helps the user send and receive e-mails, browse web pages, and access streaming media.

The audio output unit 703 may convert audio data received by the radio frequency unit 701 or the network module 702 or stored in the memory 709 into an audio signal, and output the audio signal as a sound. In addition, the audio output unit 703 may further provide an audio output (for example, a call signal received sound or a message received sound) related to a specific function performed by the terminal 700. The audio output unit 703 includes a speaker, a buzzer, a telephone receiver, and the like.

The input unit 704 is configured to receive an audio or video signal. The input unit 704 may include a graphics processing unit (GPU) 7041 and a microphone 7042. The graphics processing unit 7041 processes image data of a still picture or a video obtained by an image capture apparatus (for example, a camera) in an image capture mode or a video capture mode. A processed image frame may be displayed on the display unit 706. An image frame processed by the graphics processing unit 7041 may be stored in the memory 709 (or another storage medium) or sent by the radio frequency unit 701 or the network module 702. The microphone 7042 can receive a sound and can process the sound into audio data. The processed audio data can be converted in a telephone call mode into a format that can be sent to a mobile communications base station through the radio frequency unit 701, for outputting.

The terminal 700 further includes at least one sensor 705, for example, an optical sensor, a motion sensor, and another sensor. Specifically, the optical sensor includes an ambient light sensor and a proximity sensor. The ambient light sensor may adjust luminance of a display panel 7061 based on brightness of ambient light. The proximity sensor may turn off the display panel 7061 and/or backlight when the terminal 700 moves to an ear. As a type of motion sensor, an accelerometer sensor can detect magnitudes of accelerations in all directions (usually three axes), can detect a magnitude and a direction of gravity when the terminal is in a stationary state, and can be applied to terminal posture recognition (such as screen switching between portrait and landscape, related games, and magnetometer posture calibration), functions related to vibration recognition (such as pedometer and tapping), and the like. The sensor 705 may further include a fingerprint sensor, a pressure sensor, an iris sensor, a molecular sensor, a gyroscope, a barometer, a hygrometer, a thermometer, an infrared sensor, and the like. Details are not described herein.

The display unit 706 is configured to display information input by the user or information provided for the user. The display unit 706 may include the display panel 7061. The display panel 7061 may be configured in a form of a liquid crystal display (LCD), an organic light-emitting diode (OLED), or the like.

The user input unit 707 may be configured to receive input digit or character information, and generate a key signal input related to a user setting and function control of the terminal. Specifically, the user input unit 707 includes a touch panel 7071 and other input devices 7072. The touch panel 7071, also referred to as a touchscreen, may capture a touch operation performed by the user on or near the touch panel (for example, an operation performed by the user on the touch panel 7071 or near the touch panel 7071 by using any appropriate object or accessory such as a finger or a stylus). The touch panel 7071 may include two parts: a touch detection apparatus and a touch controller. The touch detection apparatus detects a touch direction of the user, detects a signal carried by a touch operation, and transmits the signal to the touch controller. The touch controller receives touch information from the touch detection apparatus, converts the touch information into point coordinates, sends the point coordinates to the processor 710, and receives and executes a command sent by the processor 710. In addition, the touch panel 7071 may be implemented in a plurality of forms, for example, as a resistive, capacitive, infrared, or surface acoustic wave touch panel. The user input unit 707 may further include other input devices 7072 in addition to the touch panel 7071. Specifically, the other input devices 7072 may include but are not limited to a physical keyboard, a function key (such as a volume control key or a power on/off key), a trackball, a mouse, a joystick, and the like. Details are not described herein.

Further, the touch panel 7071 may cover the display panel 7061. After the touch panel 7071 detects a touch operation on or near the touch panel, the touch panel 7071 transmits the touch operation to the processor 710 to determine a type of a touch event. Then the processor 710 provides a corresponding visual output on the display panel 7061 based on the type of the touch event. Although the touch panel 7071 and the display panel 7061 are used as two separate components to implement input and output functions of the terminal in FIG. 7, the touch panel 7071 and the display panel 7061 may be integrated to implement the input and output functions of the terminal in some embodiments. This is not specifically limited herein.

The interface unit 708 is an interface for connecting an external apparatus to the terminal 700. For example, the external apparatus may include a wired or wireless headphone port, an external power (or battery charger) port, a wired or wireless data port, a memory card port, a port for connecting an apparatus having an identification module, an audio input/output (I/O) port, a video I/O port, an earphone port, and the like. The interface unit 708 may be configured to receive an input (for example, data information or power) from an external apparatus, and transmit the received input to one or more components in the terminal 700, or may be configured to transmit data between the terminal 700 and an external apparatus.

The memory 709 may be configured to store a software program and various data. The memory 709 may mainly include a program storage area and a data storage area. The program storage area may store an operating system, an application program required for at least one function (such as a sound play function and an image play function), and the like. The data storage area may store data created based on use of the mobile phone (such as audio data and a phone book), and the like. In addition, the memory 709 may include a high-speed random access memory, or may include a non-volatile memory, for example, at least one magnetic disk storage device, a flash memory, or other non-volatile solid-state storage devices.

The processor 710 is a control center of the terminal. The processor 710 uses various interfaces and lines to connect all parts of the entire terminal, and performs various functions and data processing of the terminal by running or executing the software program and/or module stored in the memory 709 and invoking data stored in the memory 709, thereby performing overall monitoring on the terminal. The processor 710 may include one or more processing units. Optionally, the processor 710 may integrate an application processor and a modem processor. The application processor mainly processes the operating system, a user interface, an application program, and the like. The modem processor mainly processes wireless communication. It may be understood that the modem processor may alternatively not be integrated into the processor 710.

The terminal 700 may further include the power supply 711 (such as a battery) supplying power to the components. Optionally, the power supply 711 may be logically connected to the processor 710 via a power management system, so that functions such as charge and discharge management and power consumption management are implemented by using the power management system.

In addition, the terminal 700 includes some functional modules that are not illustrated. Details are not described herein.

Optionally, an embodiment of the present disclosure further provides a terminal, including a processor 710, a memory 709, and a program stored in the memory 709 and capable of running on the processor 710. When the program is executed by the processor 710, the processes of the foregoing transmission method embodiment can be implemented, with a same technical effect achieved. To avoid repetition, details are not described herein again.

An embodiment of the present disclosure further provides a computer-readable storage medium. The computer-readable storage medium stores a computer program, and when the computer program is executed by a processor, the processes of the transmission method on the network device side according to the embodiments of the present invention are implemented, or when the computer program is executed by a processor, the processes of the transmission method on the terminal side according to the embodiments of the present invention are implemented, with a same technical effect achieved. To avoid repetition, details are not described herein again. The computer-readable storage medium is, for example, a read-only memory (ROM), a random access memory (RAM), a magnetic disk, or an optical disc.

It should be noted that in this specification, the term "comprise", "include", or any other variant thereof is intended to cover a non-exclusive inclusion, so that a process, a method, an article, or an apparatus that includes a list of elements not only includes those elements but also includes other elements that are not expressly listed, or further includes elements inherent to such process, method, article, or apparatus. In absence of more constraints, an element preceded by "includes a . . . " does not preclude existence of other identical elements in the process, method, article, or apparatus that includes the element.

According to the description of the foregoing embodiments, a person skilled in the art may clearly understand that the method in the foregoing embodiments may be implemented by software in addition to a necessary universal hardware platform or by hardware only. In most cases, the former is a more preferred implementation. Based on such an understanding, the technical solutions of the present disclosure essentially, or the part contributing to the related art may be implemented in a form of a software product. The computer software product is stored in a storage medium (for example, a ROM/RAM, a magnetic disk, or an optical disc), and includes several instructions for instructing a terminal (which may be a mobile phone, a computer, a server, an air conditioner, a base station, or the like) to perform the method described in the embodiments of the present disclosure.

It may be understood that the embodiments described in the embodiments of the present disclosure may be implemented by hardware, software, firmware, middleware, microcode, or a combination thereof. For hardware implementation, each module, unit, subunit, or submodule may be implemented in one or more application specific integrated circuits (ASIC), digital signal processors (DSP), digital signal processing devices (DSP Device, DSPD), programmable logic devices (PLD), field-programmable gate arrays (FPGA), general-purpose processors, controllers, microcontrollers, microprocessors, and other electronic units for performing the functions described in the present disclosure, or a combination thereof.

For software implementation, the technologies described in the embodiments of the present disclosure may be implemented by modules (for example, processes or functions) that perform the functions described in the embodiments of the present disclosure. Software code may be stored in the memory and executed by the processor. The memory may be implemented in or outside the processor.

The embodiments of the present disclosure are described above with reference to the accompanying drawings, but the present disclosure is not limited to the embodiments. The embodiments are only illustrative rather than restrictive. Inspired by the present disclosure, a person of ordinary skill in the art can still derive a plurality of variations without departing from the essence of the present disclosure and the protection scope of the claims. All these variations shall fall within the protection of the present disclosure.

What is claimed is:

1. A transmission method, applied to a network device and comprising:
    sending indication information, wherein the indication information comprises a first indication, the first indication is used to indicate bit information of one or more bits to be monitored by a terminal, and the one or more bits to be monitored is at least one bit of downlink control information (DCI) on a physical downlink control channel (PDCCH).

2. The method according to claim 1, wherein the bit information comprises the number of bits and/or positions of bits.

3. The method according to claim 1, wherein the indication information further comprises a second indication, and the second indication is used to indicate at least one of the following:
    the number of bits of the DCI;
    the number of cyclic redundancy check (CRC) bits;
    a radio network temporary identifier (RNTI); or,
    a scrambling identifier (ID) for PDCCH coded bits.

4. The method according to claim 1, wherein the indication information further comprises a third indication, and the third indication is used to indicate at least one of the following:
    a search space for the PDCCH;
    the number of physical downlink control channel candidates (PDCCH candidates) or a subset thereof;
    an aggregation level; or,
    a downlink control information format (DCI format).

5. The method according to claim 1, wherein the indication information is transmitted by using at least one of system information, radio resource control (RRC) signaling, a medium access control-control element (MAC-CE), or the PDCCH.

6. The method according to claim 1, wherein information transmitted on the PDCCH is used to indicate at least one of the following:
    whether the terminal needs to perform PDCCH monitoring within a first discontinuous reception DRX on-duration, wherein the first DRX on-duration is a current DRX on-duration, or next M DRX on-durations after a current moment, and M is a positive integer;
    the terminal to perform bandwidth part (BWP) switching;
    the terminal to activate or deactivate an object, wherein the object is a cell group or a carrier group;
    the terminal to stop PDCCH monitoring in a preset time period;
    the terminal to switch between receive antennas;
    a slot structure for the terminal group;
    the terminal to trigger reporting of channel state information (CSI);
    the terminal to trigger sending of a sounding reference signal (SRS);
    the terminal to receive tracking reference signal (TRS);
    the terminal to receive channel state information reference signal (CSI-RS);
    the terminal to perform at least one of beam management (BM) measurement, radio link monitoring (RLM) measurement, or radio resource management (RRM) measurement;
    at least one of a total duration of a channel occupancy time (COT) in a new radio unlicensed frequency band (NR-U), a remaining duration, or a channel access priority to the terminal;
    a power control parameter for sending an uplink physical channel and/or physical signal by the terminal; or, the terminal to activate different DRX configurations or search space configurations.

7. A network device, comprising a memory, a processor, and a program stored in the memory and capable of running on the processor, wherein when the program is executed by the processor, the steps of the transmission method according to claim 1 are implemented.

8. A transmission method, applied to a terminal and comprising:
   receiving indication information from a network device, wherein the indication information comprises a first indication, the first indication is used to indicate bit information of one or more bits to be monitored by a terminal, and the one or more bits to be monitored is at least one bit of downlink control information (DCI) on a physical downlink control channel (PDCCH); and
   monitoring the one or more bits to be monitored.

9. The method according to claim 8, wherein the bit information comprises the number of bits and/or positions of bits.

10. The method according to claim 8, wherein the indication information further comprises a second indication, and the second indication is used to indicate at least one of the following:
    the number of bits of the DCI;
    the number of cyclic redundancy check (CRC) bits;
    a radio network temporary identifier (RNTI); or,
    a scrambling ID for PDCCH coded bits.

11. The method according to claim 8, wherein the indication information further comprises a third indication, and the third indication is used to indicate at least one of the following:
    a search space for the PDCCH;
    the number of physical downlink control channel candidates (PDCCH candidates) to be monitored or a subset thereof;
    an aggregation level; or,
    a downlink control information format (DCI format).

12. The method according to claim 8, wherein that the first indication is used to indicate bit information of one or more bits to be monitored by a terminal comprises:
    the first indication is used to indicate bit information of one or more bits to be monitored by one terminal; or
    the first indication is used to indicate bit information of one or more bits to be monitored by all terminals in one terminal group.

13. The method according to claim 8, wherein the indication information is transmitted by using at least one of system information, radio resource control (RRC) signaling, a medium access control-control element (MAC-CE), or the PDCCH.

14. The method according to claim 8, wherein information transmitted on the PDCCH is used to indicate at least one of the following:
    whether the terminal needs to perform PDCCH monitoring within a first discontinuous reception (DRX) on-duration, wherein the first DRX on-duration is a current DRX on-duration, or next M DRX on-durations after a current moment, and M is a positive integer;
    the terminal to perform bandwidth part (BWP) switching;
    the terminal to activate or deactivate an object, wherein the object is a cell group or a carrier group;
    the terminal to stop PDCCH monitoring in a preset time period;
    the terminal to switch between receive antennas;
    a slot structure for the terminal;
    the terminal to trigger reporting of channel state information (CSI);
    the terminal to trigger sending of a sounding reference signal (SRS);
    the terminal to receive a tracking reference signal (TRS);
    the terminal to receive a channel state information reference signal (CSI-RS);
    the terminal to perform at least one of beam management (BM) measurement, radio link monitoring (RLM) measurement, or radio resource management (RRM) measurement;
    at least one of a total duration of a channel occupancy time (COT) in a new radio interface unlicensed frequency band (NR-U), a remaining duration, or a channel access priority to the terminal;
    a power control parameter for sending an uplink physical channel and/or physical signal by the terminal; or,
    the terminal to activate different DRX configurations or search space configurations.

15. The method according to claim 14, wherein when the one or more bits to be monitored comprise at least two bits to be monitored, a bit combination of the one or more bits to be monitored indicates that the corresponding terminal is to perform a first operation, wherein the first operation is an operation corresponding to the information transmitted on the PDCCH, and bit combinations correspond to terminals on a one-to-one basis, or bit combinations correspond to terminal groups on a one-to-one basis.

16. A terminal, comprising a memory, a processor, and a program stored in the memory and capable of running on the processor, wherein when the program is executed by the processor, the steps of a transmission method are implemented, wherein the transmission method comprises:
    receiving indication information from a network device, wherein the indication information comprises a first indication, the first indication is used to indicate bit information of one or more bits to be monitored by a terminal, and the one or more bits to be monitored is at least one bit of downlink control information (DCI) on a physical downlink control channel (PDCCH); and
    monitoring the one or more bits to be monitored.

17. The terminal according to claim 16, wherein the bit information comprises the number of bits and/or positions of bits.

18. The terminal according to claim 16, wherein the indication information further comprises a second indication, and the second indication is used to indicate at least one of the following:
    the number of bits of the DCI;
    the number of cyclic redundancy check (CRC) bits;
    a radio network temporary identifier (RNTI); or,
    a scrambling ID for PDCCH coded bits.

19. The terminal according to claim 16, wherein the indication information is transmitted by using at least one of system information, radio resource control (RRC) signaling, a medium access control-control element (MAC-CE), or the PDCCH.

20. The terminal according to claim 16, wherein information transmitted on the PDCCH is used to indicate at least one of the following:
    whether the terminal needs to perform PDCCH monitoring within a first discontinuous reception (DRX) on-duration, wherein the first DRX on-duration is a current DRX on-duration, or next M DRX on-durations after a current moment, and M is a positive integer;

the terminal to perform bandwidth part (BWP) switching;
the terminal to activate or deactivate an object, wherein the object is a cell group or a carrier group;
the terminal to stop PDCCH monitoring in a preset time period;
the terminal to switch between receive antennas;
a slot structure for the terminal;
the terminal to trigger reporting of channel state information (CSI);
the terminal to trigger sending of a sounding reference signal (SRS);
the terminal to receive a tracking reference signal (TRS);
the terminal to receive a channel state information reference signal (CSI-RS);
the terminal to perform at least one of beam management (BM) measurement, radio link monitoring (RLM) measurement, or radio resource management (RRM) measurement;
at least one of a total duration of a channel occupancy time (COT) in a new radio interface unlicensed frequency band (NR-U), a remaining duration, or a channel access priority to the terminal;
a power control parameter for sending an uplink physical channel and/or physical signal by the terminal; or,
the terminal to activate different DRX configurations or search space configurations.

* * * * *